Nov. 18, 1924.  1,515,630
H. H. STYLL ET AL
LENS
Filed April 18, 1922
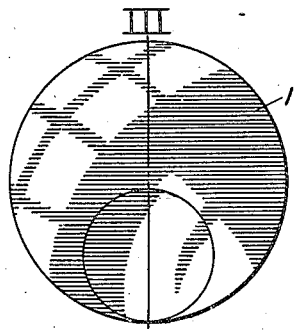
FIG.I
PRIOR ART
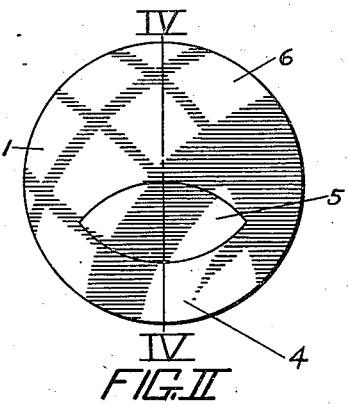
FIG.II
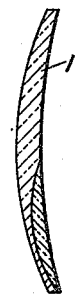
FIG.III
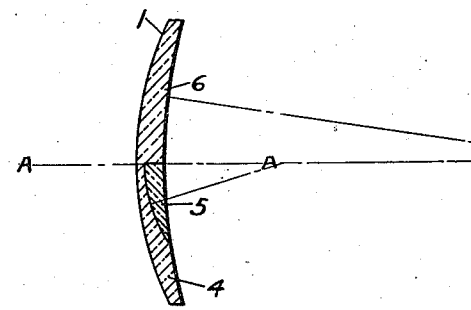
FIG.IV
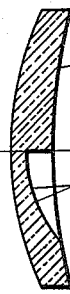
FIG.V
FIG.VII
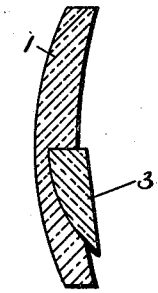
FIG.VI
INVENTOR
H. H. STYLL
E. D. TILLYER
BY
H. H. Styll & H. K. Parsons
ATTORNEYS Patented Nov. 18, 1924.

1,515,630

UNITED STATES PATENT OFFICE.

HARRY H. STYLL AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS.

Application filed April 18, 1922. Serial No. 555,069.

*To all whom it may concern:*

Be it known that we, HARRY H. STYLL and EDGAR D. TILLYER, citizens of the United States, residing at Southbridge, in the county of Worcester and State of Massachusetts, have invented certain new and useful Improvements in Lenses, of which the following is a specification.

This invention relates to new and useful improvements in lenses and more particularly to what is known as a bifocal lens. The main object of our invention is the production of a monocentric fused bifocal lens wherein the optical axis of the lens is arranged at substantially the center portion of a lens of this character.

In the usual construction of bifocal lenses it is the practice to have an axis thru the major or distance portion of the lens and an additional axis thru the reading portion of the lens and it is one of the main objects of our invention to provide an optical axis extending substantially thru the central portion of the lens.

A further object of our invention is the provision of a monocentric bifocal lens wherein the finished lens is provided with a pointed elliptical reading portion arranged within the major portion of the lens so as to provide a large major or distance portion above the reading portion and a small distance portion in the lower part of the lens. Still another purpose is to provide a process for making multifocal lenses, which consists in surfacing a recess in a glass blank to an optical surface inclined with respect to the main surface of the blank, also surfacing a segment of glass of different index of refraction approximating the curvature of the recess, constructing a segment corresponding to the curvature of the recess and securing the segment in the recess. The segment and the blank on the recessed side thereof are surfaced to an optical surface whose center of curvature is on a line passing through the center of curvature of the recess surface and the line of joinder of the segment and the blank.

With the above and other objects in view the invention consists in the novel features of construction, the combination and arrangement of parts hereinafter more fully set forth, pointed out in the claims and shown in the accompanying drawings, in which—

Figure I is a front elevation of a lens illustrating the type of lens produced in the prior art.

Figure II is a similar view illustrating our improved lens.

Figure III is a sectional view taken on the line III—III of Figure I.

Figure IV is a sectional view taken on the line IV—IV of Figure II.

Figure V is a longitudinal section thru the blank of our improved lens.

Figure VI is a similar view illustrating the button in position prior to grinding, and Figure VII is a similar view illustrating a finished lens.

As set forth above, it has been customary in the manufacture of lenses of this type to extend the button to the lower edge of the major portion of the lens and provide two optical axes, one extending thru the major or distance portion of the lens and the other extending thru the center of the reading portion. It is, therefore, the purpose of our invention to provide a lens having an optical axis extending substantially thru the joining line between the major or distance portion of the lens and the minor or reading portion and, at the same time, if desired provide for a distance portion at the lower part of the lens.

In the construction of our improved lens we provide the major portion of the lens, formed of crown glass and indicated by the numeral 1, with a countersink 2 which, as indicated, is formed tilted with respect to the general plane of the major portion or blank in such a way that the center of curvature of the button of the recess will lie in the axis of the blank, as best shown in Figure IV. In other words, by grinding the recess in this manner the optical axes of the two corrections in the lens will be produced on the line A—A, making the lens monocentric in form. In this way the inner wall of the countersink is in the form of a ledge or cliff, while in the outer portion there is no such cliff or wall the two curves intersecting each other. The result of this is that the segment or button 3 which is formed of flint glass is positioned in tilted relation to the major blank and having a different index of refraction from said blank. The flint button 3 may be secured by cement or fusion in the recess 2 and may be placed on either the inner or the outer side of the lens. The countersink bearing face is then ground off in a single continuous curve so ground, as is indicated in Figure VII, that a portion of the button at the lower edge and adjacent major portion of the glass is ground away leaving a substantially elliptical shaped reading segment as at 5 in the finished lens with a distance vision portion 6 located thereabove, and in addition there is a second distance vision portion 4 below the segment or reading portion.

Attention is also called to the fact that by providing an additional distance portion at the bottom of the lenses it will be of great assistance to the wearer for use in going up and down the stairs or other uses of this character.

The reading portion 5 is also correctly positioned within the major portion of the lens whereby the same can be readily used by the patient for the purpose desired. It is thought that the position of the reading portion 5 in our improved lens is more correctly positioned than the well known bifocal lens in use at the present time in that the vision of the eye does not have to be extended as low as in the regular bifocal.

From the above description taken in connection with the accompanying drawing it will be readily apparent that we have provided a monocentric fused bifocal lens wherein the reading portion is of pointed elliptical form and arranged with respect to the major portion of the lens so as to provide for a small distance portion below the reading portion and a larger distance portion above the reading portion, which gives a greater advantage to the person wearing the lens in that the lower distance portion can be used for distant vision in a substantially vertical plane, such as looking downwardly in passing up or down a stairway or the like, and the upper distant portion readily used for various distant objects. It will also be apparent that when the improved lens is completed the optical axis is so positioned as to substantially eliminate difficulties due to displacement of the image as the eye passes from one field to the other such as are experienced in the present commercial forms of two-part lenses.

We would further call attention to another particular advantage attained by the present construction. This resides in the fact that by so positioning the segment receiving recess and segment that the lens will be substantially monaxial and then subsequently grinding away the segment sides of the lens so that the lower edge of the segment is spaced a distance from the edge of the major blank in place of extending out over that edge, as has been the previous practice. We are able to provide a wide and sufficiently high segment for ordinary reading purposes and, at the same time, to considerably reduce the thickness of the finished lens as compared with the prior art constructions. This is due to the fact that in the manufacture of two part bifocals the thickness of the lens is governed largely by the depth of the countersink, since it is necessary that the opposed face be so ground as to be separated from the countersink and not cut into it. Thru our process of manufacture, however, we place the reading portion where needed, but due to limitation of the height for separating the lower edge from the bottom of the lens, we are able to considerably reduce the thickness of the segment, and thus allow the lens to be ground much thinner than has heretofore been possible. By referring to the monocentric form we do not mean that there can be only one optical center of both reading and distance portion but that the line of sight passes from the distance to the reading portion without any sudden optical displacement at some portion of the lens.

What we claim is—

1. A blank for a multifocal lens, comprising a blank body with a recess adapted to receive a segment of higher index, the inner face of the recess being an optical surface whose center of curvature lies on a line normal to the blank body at one edge of the recess.

2. A blank for a multifocal lens, comprising a blank body with a recess and an optical surface therein, the center of curvature of which lies approximately on a normal to the blank body at one edge of the recess, and a segment of a piece of glass of different index of refraction secured in said recess.

3. A blank for a multifocal lens, comprising a blank body with a recess and an optical surface therein whose center of curvature lies approximately on a normal to the blank body at one edge of the recess, a segment of glass of different index of refraction secured in said recess, the outer face of the segment and the corresponding face of the blank being ground to a single optical surface.

4. A process of making multifocal lenses, consisting of surfacing a recess in a glass blank to an optical surface inclined with respect to the main surface of the blank, surfacing a segment of glass of different index of refraction to the approximate curvature of the recess, securing said segment in the recess, surfacing the blank and the segment on the recessed side to an optical surface having its center of curvature on a line passing through the center of curvature of the recess surface and the line of joinder of the segment and blank.

HARRY H. STYLL.
EDGAR D. TILLYER.